United States Patent
Maloum et al.

(10) Patent No.: US 9,789,772 B2
(45) Date of Patent: Oct. 17, 2017

(54) METHOD FOR CONTROLLING A SYNCHRONOUS ELECTRICAL MACHINE, CORRESPONDING SYSTEM AND MOTOR VEHICLE COMPRISING THE SYSTEM

(71) Applicant: RENAULT s.a.s., Boulogne, Billancourt (FR)

(72) Inventors: Abdelmalek Maloum, Chevilly la Rue (FR); Ahmed Ketfi-Cherif, Elancourt (FR)

(73) Assignee: RENAULT s.a.s., Boulogne Billancourt (FR)

( * ) Notice: Subject to any disclaimer, the term of this patent is extended or adjusted under 35 U.S.C. 154(b) by 27 days.

(21) Appl. No.: 14/894,449

(22) PCT Filed: May 15, 2014

(86) PCT No.: PCT/FR2014/051129
§ 371 (c)(1),
(2) Date: Nov. 27, 2015

(87) PCT Pub. No.: WO2014/191649
PCT Pub. Date: Dec. 4, 2014

(65) Prior Publication Data
US 2016/0111993 A1 Apr. 21, 2016

(30) Foreign Application Priority Data
May 27, 2013 (FR) .................................... 13 54741

(51) Int. Cl.
G05B 11/12 (2006.01)
H02P 1/00 (2006.01)
(Continued)

(52) U.S. Cl.
CPC ...... *B60L 11/1803* (2013.01); *H02P 21/0003* (2013.01); *H02P 21/0035* (2013.01); *H02P 21/0085* (2013.01)

(58) Field of Classification Search
CPC .. H02P 21/06; H02P 2101/45; H02P 21/0021; H02P 21/20; H02P 21/50;
(Continued)

(56) References Cited

U.S. PATENT DOCUMENTS

| | | |
|---|---|---|
| 5,955,863 A | 9/1999 | Iwashita et al. |
| 7,049,779 B2 * | 5/2006 | Chen ....................... H02P 21/50 318/400.02 |

(Continued)

OTHER PUBLICATIONS

International Search Report issued on Oct. 1, 2014 for PCT/FR2014/051129 filed on May 15, 2014.
(Continued)

*Primary Examiner* — Paul Ip
(74) *Attorney, Agent, or Firm* — Oblon, McClelland, Maier & Neustadt, L.L.P.

(57) ABSTRACT

A method for controlling a permanent magnet synchronous electrical machine powered by a battery delivering a supply voltage to terminals of the battery, the method including: calculating an initial direct voltage component Vdc and an initial quadratic voltage component in a rotating reference; checking a saturation condition; calculating an angle α of a formula; generating voltages to be applied to the electrical machine if α varies negatively and Vdc is positive or if α varies positively and V dc is negative. The method for example can be applied in a control of synchronous electrical machines.

8 Claims, 3 Drawing Sheets

(51) Int. Cl.
*B60L 11/18* (2006.01)
*H02P 21/00* (2016.01)

(58) Field of Classification Search
CPC .............. H02P 2201/09; H02P 2205/05; H02P 2207/05; H02P 27/08; H02P 21/0085; H02P 21/0089; H02P 21/05; H02P 21/14; H02P 21/16
USPC ......... 318/139, 690, 400.02, 400.09, 400.12, 318/400.15
See application file for complete search history.

(56) References Cited

U.S. PATENT DOCUMENTS

| | | | | |
|---|---|---|---|---|
| 8,193,749 B2* | 6/2012 | Yamamoto | .......... | H02P 21/0021 318/400.09 |
| 2006/0049792 A1* | 3/2006 | Chen | .......... | H02P 21/50 318/716 |
| 2007/0063665 A1* | 3/2007 | Matsuo | .......... | H02P 21/18 318/801 |
| 2008/0224649 A1 | 9/2008 | Bae et al. | | |
| 2010/0134056 A1* | 6/2010 | Yamamoto | .......... | H02P 21/0021 318/400.15 |
| 2010/0271853 A1* | 10/2010 | Furutani | .......... | H02M 7/53875 363/132 |
| 2012/0268046 A1* | 10/2012 | Yamazaki | .......... | H02P 21/146 318/400.02 |
| 2014/0042938 A1* | 2/2014 | Shoji | .......... | H02P 21/14 318/400.02 |
| 2015/0318807 A1* | 11/2015 | Xia | .......... | H02P 6/34 318/400.12 |

OTHER PUBLICATIONS

French Search Report issued on Nov. 15, 2013 for FR 1354741 filed on May 27, 2013.

* cited by examiner

METHOD FOR CONTROLLING A SYNCHRONOUS ELECTRICAL MACHINE, CORRESPONDING SYSTEM AND MOTOR VEHICLE COMPRISING THE SYSTEM

The invention relates to the control of a synchronous electrical machine with permanent magnet and in particular the control of the electrical machines intended to be installed in motor vehicles with electrical or hybrid drive.

In motor vehicles with electrical drive, the torque supplied by an electric motor must be controlled. Since the torque from an electrical machine is directly linked to the current flowing therein, these currents have to be controlled with precision.

In a synchronous machine, notably a three-phase synchronous machine with permanent magnet and axial flux, the currents flowing in the three phases of the stator are sinusoidal and each phase-shifted by $$\frac{2\pi}{3} \text{ rad.}$$

These currents create a revolving magnetic field in the electric machine. The rotor consists of a permanent magnet, for example provided with five pairs of poles. As in a compass, the rotor is naturally aligned on the revolving magnetic field created by the stator. Thus, the rotation frequency of the rotor is equal to the frequency of the currents of the stator. It is the amplitudes of the currents of the stator and the power of the magnets of the rotor which create the torque necessary for the rotation of the machine. To control these currents, it is therefore necessary to apply to each phase of the stator sinusoidal voltages each equally phase-shifted by $$\frac{2\pi}{3} \text{ rad.}$$

Generally, it is more simple to apply a regulation to constants than to sinusoidal signals. The Park transform is generally used to project a three-phase system onto a two-dimensional space to obtain an equivalent revolving reference frame. It is thus possible to transpose the three currents and the three sinusoidal voltages of the stator relative to the three phases of a three-phase system into a space where the sinusoidal signals are expressed in the form of constant signals (one component on the direct axis d and one component on the quadrature axis q). In the case of a synchronous machine the Park reference frame is linked to the rotor.

By working with currents and voltages expressed in the Park space, it is thus possible to act on currents and constant voltages rather than on sinusoidal signals to regulate the three-phase machine to be controlled. By doing the inverse transform, it is possible to revert to the normal reference frame of the machine and therefore know exactly what voltages or what currents to apply to each phase of the machine.

Generally, batteries are used to power these machines. The use of a battery limits the possible controls. Because of this, it is not possible to apply just any setpoints. The setpoints succeeding these limits can, if they are applied, render the machine unstable.

Among the constraints to be observed, it is generally advisable to prevent the saturation of the machine.

Reference will be able to be made to the document U.S. Pat. No. 3,851,234 which describes a method for avoiding the magnetic saturation by reducing the speed of the torque motor.

Reference will also be able to be made to the document U.S. Pat. No. 5,015,937 which describes the control of a synchronous machine with open loop wound rotor with data tables intended to avoid the saturations.

The document U.S. Pat. No. 6,181,091 describes the control of a synchronous machine with permanent magnet in which the saturation is avoided by modifying the operation of the width modulation of pulses which apply voltages to each branch of the motor.

The aim of the invention is to limit the duration of a saturation condition. Another aim of the invention is to retain the regulation of the torque which has to be supplied by the electrical machine.

The subject of the invention is therefore, according to a first aspect, a method for controlling a synchronous electrical machine with permanent magnet powered by a battery delivering a power supply voltage at its terminals.

According to a general feature, the method comprises:

a computation of an initial direct voltage component and of an initial quadratic voltage component in a revolving reference frame comprising a plurality of axes, a verification of a saturation condition in which it is verified, in an orthogonal reference frame having the direct voltage components for X-axis and the quadratic voltage components for Y-axis, that the point of coordinates Vdc and Vqc is outside of a range dependent on Vbat and delimited by a contour, Vdc denoting the initial direct voltage component, Vqc denoting the initial quadratic voltage component and Vbat denoting the power supply voltage at the terminals of the battery, and, if the saturation condition is verified, a computation of an angle $$\alpha = \arctan\left(\frac{Vqc}{Vdc}\right),$$

a generation of voltages to be applied to the electrical machine if α varies negatively and Vdc is positive or if α varies positively and Vdc is negative, by determining the point of intersection between said contour and the straight line passing through the origin of the orthogonal reference frame and said point of coordinates Vdc and Vqc, the direct voltage component to be applied being the X-axis of the intersection and the quadratic voltage component to be applied being the Y-axis of the intersection.

In this method, if a condition is not verified, then the voltages already applied are applied. As will be understood, the method is implemented at an instant, with always the same period between two implementations. It is the voltages of a preceding implementation which will be applied if a condition is not verified in the method.

The computation of an initial direct voltage component and of an initial quadratic voltage component can be implemented by any means, for example by using a proportional integral corrector or a proportional integral derivative corrector. The method according to the invention can therefore be implemented using various existing systems.

The range can be a circle of radius $$\frac{Vbat}{\sqrt{3}}$$

centered on the origin of the orthogonal reference frame. Thus, if $\sqrt{Vdc^2+Vqc^2}$ is greater than $$\frac{Vbat}{\sqrt{3}},$$

then it is considered that the electrical machine is in saturation mode. If this condition is not verified, it is then possible to apply the voltages applied in the last implementation of the method, after an inverse Park transform.

The verification of a saturation condition can comprise a comparison between $\sqrt{Vdc^2+Vqc^2}$ and $$\frac{Vbat}{\sqrt{3}}.$$

Also, said generation of voltages to be applied can comprise a generation of voltages to be applied to the electrical machine with a direct voltage component to be applied equal to $$\frac{Vbat}{\sqrt{3}}\cos(\alpha)$$

and a quadratic voltage component to be applied equal to $$\frac{Vbat}{\sqrt{3}}\sin(\alpha)$$

is α varies negatively and Vdc is positive or if α varies positively and Vdc is negative.

To obtain a good torque and limit the losses, it is advisable to limit the current flowing in the direct axis. Because of this, if the trend of the angle α taken into consideration with the sign of the voltage Vdc indicates that the voltage on the direct axis will increase, then the saturation condition is left by applying new voltage values which make it possible to retain this angle α.

If the machine is in saturation mode but there is a trend toward a decrease in the voltage in the direct axis, then the voltages previously applied are applied. A good torque is thus obtained.

Also the subject of the invention, according to another aspect, is a system for controlling a synchronous electrical machine with permanent magnet powered by a battery having a voltage at its terminals.

According to a general feature, the system comprises:
computation means configured to deliver an initial direct voltage component and an initial quadratic voltage component in a revolving reference frame comprising a plurality of axes,
computation means configured to verify a saturation condition in an orthogonal reference frame having the direct voltage components for X-axis and the quadratic voltage components for Y-axis, the means configured to verify a saturation condition being configured to verify that the point of coordinates Vdc and Vqc is outside of a range dependent on Vbat and delimited by a contour, Vdc denoting the initial direct voltage component, Vqc denoting the initial quadratic voltage component and Vbat denoting the power supply voltage at the terminals of the battery, and, if the saturation condition is verified,
computation means configured to compute an angle $$\alpha = \arctan\left(\frac{Vqc}{Vdc}\right)$$

if said saturation condition is verified,
means for generating voltages to be applied to the electrical machine configured to determine, if the saturation condition is verified and if α varies negatively and Vdc is positive or if α varies positively and Vdc is negative, the point of intersection between said contour and the straight line passing through the origin of the orthogonal reference frame and said point of coordinates Vdc and Vqc, the direct voltage component to be applied being the X-axis of the intersection and the quadratic voltage component to be applied being the Y-axis of the intersection.

The computation means configured to verify a saturation condition can further be configured to compare $\sqrt{Vdc^2+Vqc^2}$ and $$\frac{Vbat}{\sqrt{3}}.$$

The means for generating voltages to be applied to the electrical machine can further be configured to generate a direct voltage component to be applied equal to $$\frac{Vbat}{\sqrt{3}}\cos(\alpha)$$

and a quadratic voltage component to be applied equal to $$\frac{Vbat}{\sqrt{3}}\sin(\alpha)$$

it α varies negatively and Vdc is positive or if α varies positively and Vdc is negative.

Also the subject of the invention, according to yet another aspect, is a motor vehicle with electric or hybrid drive comprising a synchronous machine with permanent magnet and said system.

Other aims, features and advantages of the invention will become apparent on reading the following description, given purely as a nonlimiting example, and with reference to the attached drawings in which.

Figure 1:
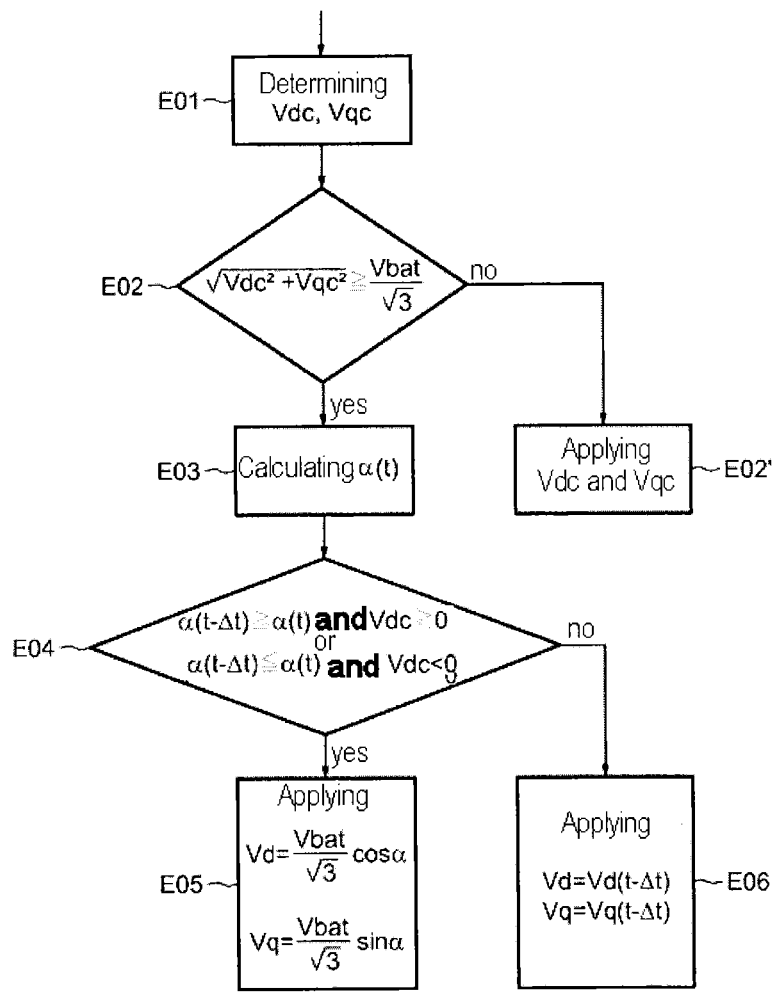
FIG. 1 illustrates different steps of a method according to the invention.

FIG. 1 schematically shows steps of a method according to one aspect of the invention. In this example, the saturation condition corresponds to the verification that a point is in a circle of radius $$\frac{Vbat}{\sqrt{3}}.$$

This method makes it possible to control a synchronous electrical machine, for example a synchronous machine of a motor vehicle with electric or hybrid drive.

The method comprises a step E01 of computation of an initial direct voltage component denoted Vdc and of an initial quadratic voltage component denoted Vqc in a revolving reference frame comprising a plurality of axes, for example the Park reference frame. The computation of Vdc and of Vqc can be implemented by any means, for example by using a proportional integral corrector or a proportional integral derivative corrector.

The method then comprises a test step E02 in which $\sqrt{Vdc^2+Vqc^2}$ and $$\frac{Vbat}{\sqrt{3}}$$

are compared, Vbat being the power supply voltage supplied by the battery which powers the electrical machine. If this condition is not verified, the step E02' is implemented in which Vdc and Vqc are applied directly to the machine.

If $\sqrt{Vdc^2+Vqc^2}$ is greater than $$\frac{Vbat}{\sqrt{3}},$$

a step E03 is implemented to compute an angle denoted α, obtained by the following computation $$\alpha = \arctan\left(\frac{Vqc}{Vdc}\right).$$

The computation of the angle α makes it possible to implement another test step E04 in which, at an instant t, it is verified how alpha varies relative to the preceding implementation of the method at the instant t−Δt, and the sign of Vdc is verified.

If α varies negatively and Vdc is positive, or if α varies positively and Vdc is negative, then it is possible to implement the step E05 and apply a voltage to the direct axis equal to $$\frac{Vbat}{\sqrt{3}}\cos(\alpha)$$

and a voltage to the quadratic axis equal to $$\frac{Vbat}{\sqrt{3}}\sin(\alpha).$$

If the test of the step E04 is not verified, then the step E06 is implemented, in which the voltages already applied in the preceding implementation of the method are applied.

Figure 2:
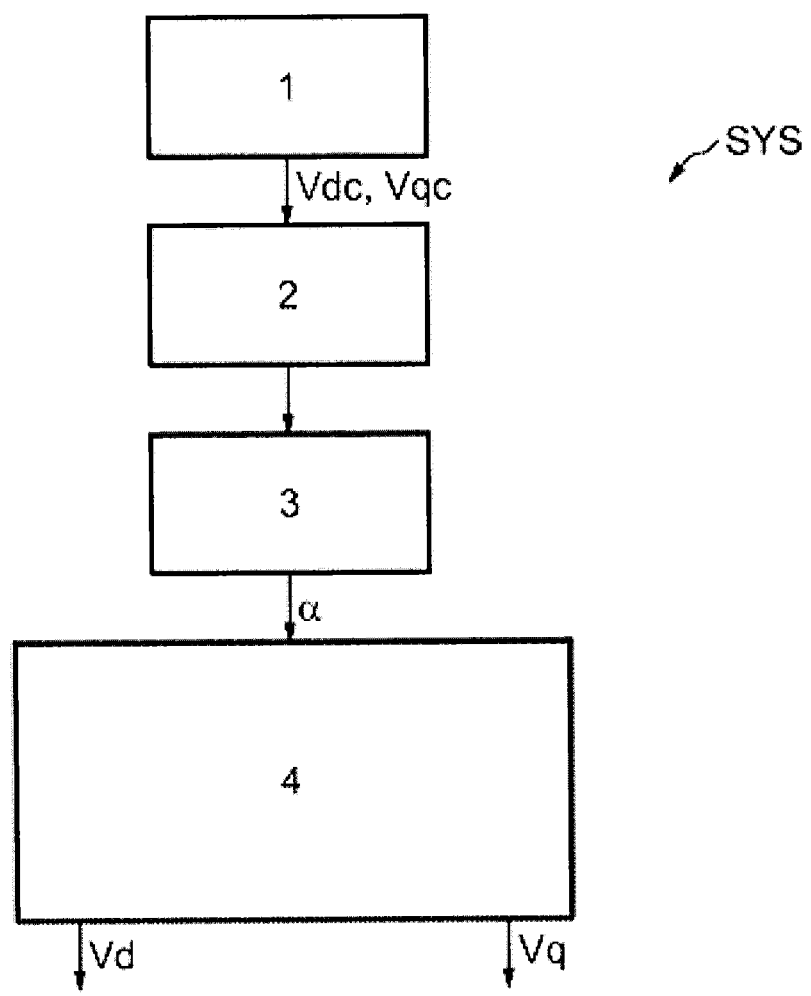
FIG. 2 illustrates a system according to the invention.

FIG. 2 schematically represents a system SYS for controlling a synchronous electrical machine with permanent magnet powered by a battery.

The various computation means of the system SYS can be contained in a computation unit, for example an electronic control unit of a motor vehicle.

The system SYS comprises computation means 1 configured to implement the step E01 and deliver an initial direct voltage component Vdc and an initial quadratic voltage component Vdc in a revolving reference frame comprising a plurality of axes, for example the Park reference frame. Vdc and Vqc are voltage setpoints computed in the step E01 that are desired to be applied.

The system SYS also comprises computation means 2 for implementing the step E02 and configured to compare $\sqrt{Vdc^2+Vqc^2}$ and $$\frac{Vbat}{\sqrt{3}}.$$

The system SYS also comprises computation means 3 configured to compute an angle $$\alpha = \arctan\left(\frac{Vqc}{Vdc}\right)$$

is $\sqrt{Vdc^2+Vqc^2}$ is greater than $$\frac{Vbat}{\sqrt{3}}$$

(and implement the step E03).

The system SYS also comprises means 4 for generating voltages to be applied to the machine, the means being configured to deliver, if $\sqrt{Vdc^2+Vqc^2}$ is greater than $$\frac{Vbat}{\sqrt{3}},$$

a direct voltage component to be applied equal to $$\frac{Vbat}{\sqrt{3}}\cos(\alpha)$$

and a quadratic voltage component to be applied equal to $$\frac{Vbat}{\sqrt{3}}\sin(\alpha)$$

if α varies negatively and Vdc is positive or if α varies positively and Vdc is negative.

It should be noted that, in the Park space, the equation system to be controlled for the synchronous machine is as follows:

$$\begin{cases} V_d = R_s I_d + L_d \dot{I}_d - \omega_r L_q I_q \\ V_q = R_s I_q + L_q \dot{I}_q - \omega_r (L_d I_d + \phi_f) \end{cases} \quad (1)$$

With $V_d$ and $V_q$ being the voltages applied to the two axes, respectively direct and in quadrature, of the Park plane of the machine, $I_d$ and $I_q$ being the currents flowing in the machine on the two axes, respectively direct and in quadrature, of the Park plane, $R_s$ being the equivalent resistance of the stator of the machine, $L_d$ and $L_q$ being the inductances on each axis, respectively direct and in quadrature, of the Park plane of the machine, $\omega_r$ being the rotation speed of the magnetic field of the machine (i.e. the rotation speed of the rotor multiplied by the number of pairs of poles of the machine), and $\Phi_f$ being the flux generated by the magnets of the rotor.

For a machine in which $L_d$ and $L_q$ are equal, the following electromagnetic torque value $C_{em}$ is obtained:

$$C_{em} = p \Phi_f I_q$$

With p being the number of pairs of poles of the rotor of the machine.

This is the torque that should be retained while avoiding the saturation.

Figure 3:
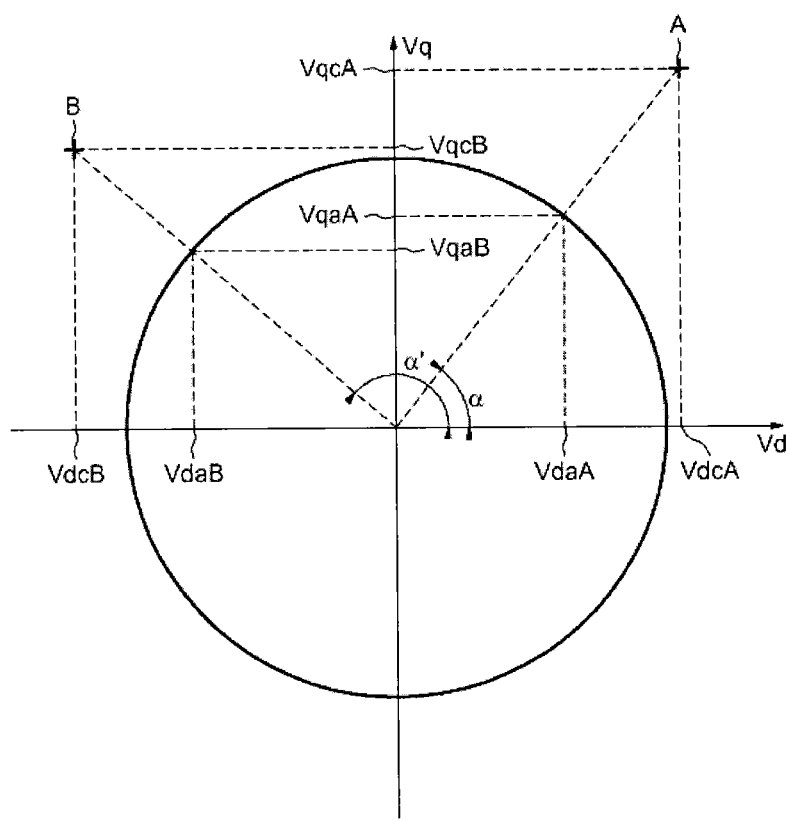
FIG. 3 illustrates a graphic representation for determining if the machine is in saturation mode.

FIG. 3 is a graphic representation of voltage values, respectively direct and in quadrature (Vd on the X-axis and Vq on the Y-axis), of the Park plane of the machine.

In this figure, the saturation limit has been represented by a circle drawn in a thick line. The operating points located within this circle correspond to non-saturated operating conditions.

If, by calculation, the operating point A, corresponding to VdcA and VqcA, is obtained, it can be concluded that there is saturation. The angle α represented in FIG. 3 can then be determined.

If it is concluded that the angle α has decreased relative to the last implementation of the method, and since VdcA is positive, then voltage components, direct and in quadrature, are applied by choosing a point corresponding to the intersection between the circle and the straight line starting from the origin with an angle α. This point has VdaA for X-axis and VqaA for Y-axis.

If, however, the angle α has increased, then the same voltage values continue to be applied.

If, by calculation, the operating point B, corresponding to VdcB (negative) and VqcB, is obtained, it can be concluded that there is saturation. The angle α' represented in FIG. 3 can then be determined.

If it is concluded that the angle α' has increased relative to the last implementation of the method, and since VdcB is negative, then voltage components, direct and in quadrature, are applied by choosing a point corresponding to the intersection between the circle and the straight line starting from the origin with an angle α'. This point has VdaB for X-axis and VqaB for Y-axis.

If, however, the angle α has decreased, then the same voltage values continue to be applied.

By virtue of the invention, a saturation condition can be rapidly left, while retaining a good regulation of the voltages, in particular a zero current on the direct axis.

The invention claimed is:

1. A method for controlling a synchronous electrical machine with a permanent magnet powered by a battery delivering a power supply voltage at its terminals, the method comprising:

computing, via processing circuitry, an initial direct voltage component Vdc and an initial quadratic voltage component Vqc in a revolving reference frame having a plurality of axes;

verifying, via the processing circuitry, a saturation condition by verifying, in an orthogonal reference frame having the direct voltage components for X-axis and the quadratic voltage components for Y-axis, that a point of coordinates Vdc and Vqc is outside of a range dependent on Vbat and delimited by a contour, Vbat denoting a power supply voltage at terminals of the battery;

computing, when the saturation condition is verified and via the processing circuitry, an angle $$\alpha = \arctan\left(\frac{Vqc}{Vdc}\right);$$

generating, via the battery and when the saturation condition is verified and if α varies negatively and Vdc is positive or if α varies positively and Vdc is negative, a direct axis voltage and quadratic axis voltage by determining a point of intersection between the contour and a straight line passing through the origin of the orthogonal reference frame and the point of coordinates Vdc and Vqc, the direct axis voltage corresponding to the X-axis of the intersection and the quadratic axis voltage corresponding to the Y-axis of the intersection; and applying to the electrical machine, via the battery and based on the saturation condition, Vdc and α, one of Vdc and Vqc, direct axis voltage and quadratic axis voltage, and a preceding direct axis voltage and preceding quadratic axis voltage.

2. The method as claimed in claim 1, wherein the verification of a saturation condition includes a comparison between $\sqrt{Vdc^2 + Vqc^2}$ and $$\frac{Vbat}{\sqrt{3}}.$$

3. The method as claimed in claim 2, wherein the direct axis voltage to be applied is equal to $$\frac{Vbat}{\sqrt{3}} \cos(\alpha)$$

and the quadratic axis voltage to be applied is equal to $$\frac{Vbat}{\sqrt{3}} \sin(\alpha)$$

if α varies negatively and Vdc is positive or if α varies positively and Vdc is negative.

4. The method as claimed in claim 1, further comprising:

applying, via the battery and when the saturation condition is not satisfied, the initial direct voltage component Vdc and the initial quadratic voltage component Vqc to the electrical machine; and applying, via the battery and if α varies negatively and Vdc is positive or if α varies positively and Vdc is negative, the direct axis voltage and quadratic axis voltage to the electrical machine, and if not, applying a preceding direct axis voltage and preceding quadratic axis voltage to the electrical machine.

5. A system for controlling a synchronous electrical machine with permanent magnet, the system comprising:
processing circuitry
configured to compute, at an instant, an initial direct voltage component Vdc and an initial quadratic voltage component Vqc in a revolving reference frame having a plurality of axes,
configured to verify a saturation condition by verifying, in an orthogonal reference frame having the direct voltage components for X-axis and the quadratic voltage components for Y-axis, that a point of coordinates Vdc and Vqc is outside of a range dependent on Vbat and delimited by a contour, Vbat denoting a power supply voltage at terminals of the battery configured to compute an angle $$\alpha = \arctan\left(\frac{Vqc}{Vdc}\right)$$

if the saturation condition is verified, and
a battery configured to
power the permanent magnet of the electrical machine and configured to generate, when the saturation condition is verified and if α varies negatively and Vdc is positive or if α varies positively and Vdc is negative, a direct axis voltage and quadratic axis voltage to be applied to the electrical machine by determining a point of intersection between the contour and a straight line passing through the origin of the orthogonal reference frame and the point of coordinates Vdc and Vqc, the direct axis voltage corresponding to the X-axis of the intersection and the quadratic axis voltage corresponding to the Y-axis of the intersection, and
apply to the electrical machine, based on the saturation condition, Vdc and α, one of Vdc and Vqc, direct axis voltage and quadratic axis voltage, and a preceding direct axis voltage and preceding quadratic axis voltage.

6. The system as claimed in claim 5, wherein the processing circuitry is configured to verify the saturation condition by comparing $\sqrt{Vdc^2 + Vqc^2}$ and $$\frac{Vbat}{\sqrt{3}}.$$

7. The system as claimed in claim 6, wherein the direct axis voltage is equal to $$\frac{Vbat}{\sqrt{3}}\cos(\alpha)$$

and the quadratic axis voltage is equal to $$\frac{Vbat}{\sqrt{3}}\sin(\alpha),$$

if α varies negatively and Vdc is positive or if α varies positively and Vdc is negative.

8. A motor vehicle with electric or hybrid drive comprising:
a synchronous machine with permanent magnet and the machine control system as claimed in claim 5.

* * * * *